UNITED STATES PATENT OFFICE.

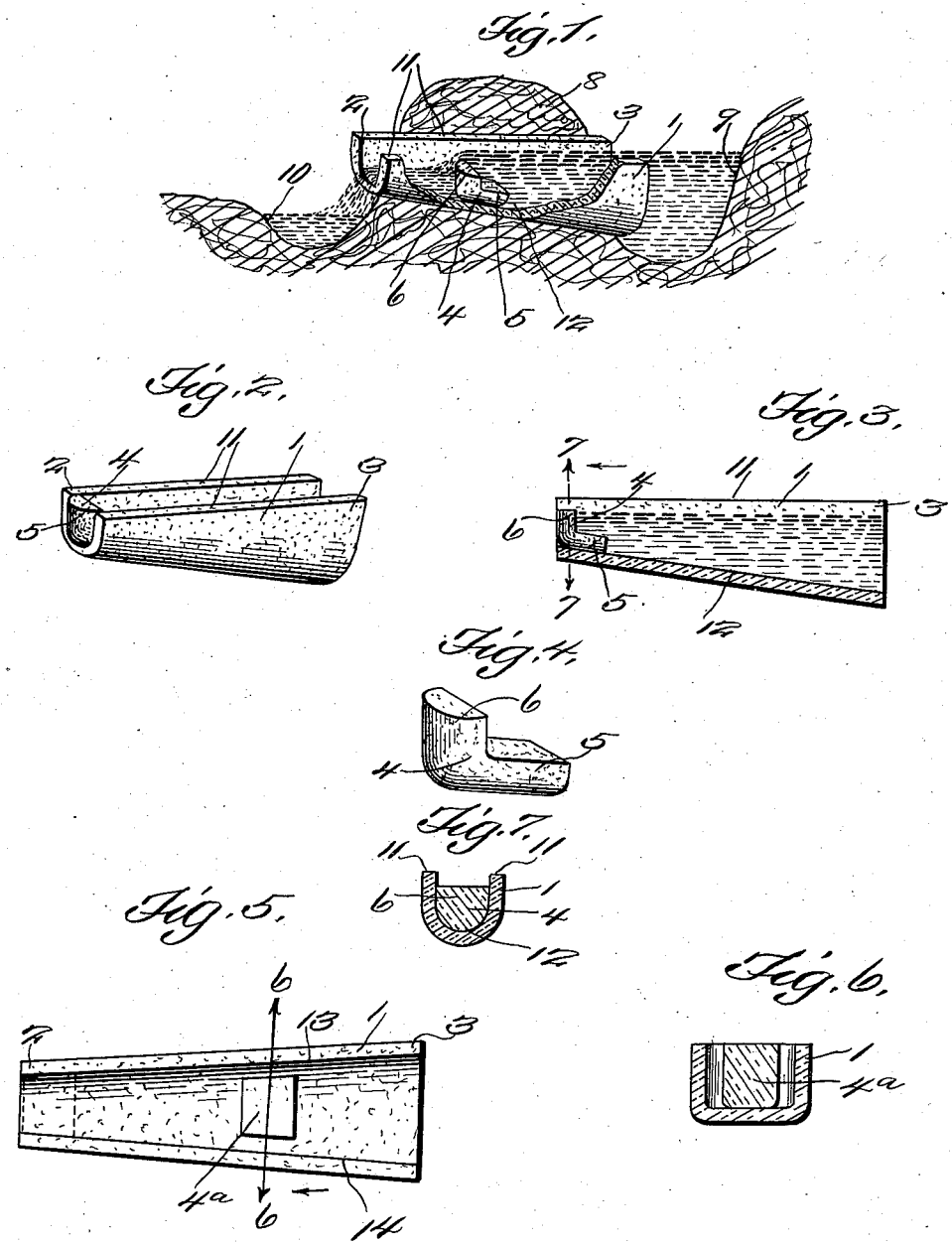

GEORGE RAPPEEN PROCTOR, OF GRAND VIEW, IDAHO.

IRRIGATION-REGULATOR.

1,028,780.  Specification of Letters Patent.  Patented June 4, 1912.

Application filed November 25, 1911. Serial No. 662,433.

*To all whom it may concern:*

Be it known that I, GEORGE R. PROCTOR, a citizen of the United States, residing at Grand View, in the county of Owyhee and State of Idaho, have invented a new and useful Irrigation-Regulator; and I do hereby declare the following to be a full, clear, and exact description of the invention, such as will enable others skilled in the art to which it appertains to make and use the same.

This invention relates to the art of irrigation, and it more especially pertains to a new and useful regulator for the irrigating fluid. This regulator of improved type is unlike "tap boxes" and "headgates", in that the gate is not raised vertically to permit the irrigating fluid to pass thereunder.

The object of the present invention is the provision of a regulator having a gate, adjustable in such wise, as to permit the irrigating fluid to pass over the gate, instead of under the same, the gate being retained in its adjusted position by virtue of the force of gravity.

A feature of the invention is the provision of trough like member having an inclined bottom, along which the gate is adjustable, so as to increase or decrease the flow of the irrigating fluid.

Another feature of the invention, is the fact that the gate is substantially angular in longitudinal section, and comprises a long and short portion, the longer portion of which when arranged upright at one end of the trough like member, will be flush with the upper edges of the trough like member, thereby preventing the irrigating fluid from passing. When the shorter portion of a gate is arranged upright, it will be substantially level with the fluid and slightly below the upper edges of the trough like member, that is, when arranged at one end of the trough like member, but will not permit the fluid to escape. By moving the gate down the inclined bottom of the trough like member, when the shorter end of the gate is upright, the fluid is allowed to pass over the gate, and the farther the gate is moved the greater the flow of the fluid. However, the fluid may be allowed to pass even if the longer portion of the gate be upright, by moving the gate down the inclined bottom.

This regulator may be constructed of any suitable material, such as metals, crockery, glass and cement etc., but preferably cement.

The invention comprises further features and combination of parts, as hereinafter set forth, shown in the drawings and claimed.

In the drawings;—Figure 1 is a view in perspective showing the application of the improved regulator constructed in accordance with the invention for irrigating various lands. Fig. 2 is a perspective view of the trough like member of the irrigator, showing the longer portion of the gate upright with the gate arranged at one end of the trough like member. Fig. 3 is a sectional view longitudinally through the trough like member, showing the gate arranged at the same end as in Fig. 2, but with the shorter portion of the gate upright. Fig. 4 is a detail view of the gate. Fig. 5 is a plan view of a modified form of trough like member. Fig. 6 is a sectional view on line 6—6 of Fig. 5. Fig. 7 is a sectional view on line 7—7 of Fig. 3.

Referring more especially to the drawings, 1 designates a trough like member, constructed preferably of cement or the like, one end of which in the present instance is termed the "distal" end, while the other end the "proximal" end 3. The trough like member has its bottom inclined from the "distal" end 2 to the "proximal" end 3, in suchwise as to make the "proximal" end twice the depth of the "distal" end, as shown. A gate 4 is provided, which is angular in longitudinal section and comprises a long and short portion 5 and 6. The surfaces (which engage the inclined bottom of the trough like member) of the gate are of a contour to fit snugly the transverse curvature of the trough like member, as shown in Fig. 7.

To irrigate lands, the trough like member is arranged in a hill 8, between the supply ditch 9 and the feed ditch 10, with the upper edges 11 of the trough like member substantially level, as shown in Fig. 1, after which the gate is adjusted along the inclined bottom 12 of the trough like member, with the shorter portion or arm upright, until the proper flow of irrigating fluid is obtained. When not irrigating, the gate is arranged at the "distal" end 2 of the trough like member, with the longer portion or arm upright, as shown in the drawings. It will be observed, that, by the provision of the improved reversible gate, adjustable along the inclined bottom of the trough like member, floating foreign matters and debris will be permitted to float over the top of the gate. As the gate is advanced along the inclined bottom of the trough like member the flow of the fluid is increased.

In Figs. 5 and 6 the flow of the fluid is around the sides of the gate, in lieu of passing over the same, by virtue of the fact that, the trough like member is provided with inclined sides 13 and 14, tapering together from the "proximal" end 3 to the "distal" end 2 in place of the inclined bottom. In Figs. 5 and 6 the gate may be angular as in Figs. 1, 2, 3 and 4, or in the form of a block 4ª, as shown.

From the foregoing it will be noted that, there has been devised a novel, efficient and simple regulator, of such a construction, that the irrigating fluid is allowed to pass over the gate in lieu of under the same, and one which has been found practical.

The invention having been set forth, what is claimed as new and useful is:—

1. In a regulator, a trough like member smaller at one end than at the other and having an inclined portion, and a reversible gate to fit the smaller end and adjustable longitudinally of the trough like member, to permit fluid to pass thereby in regulated quantities.

2. In a regulator, a trough like member having an inclined bottom with the sides arranged equal distances apart at each end, and a reversible angular gate to fit the sides of the trough like member and adapted to be adjusted longitudinally of the inclined bottom, so as to permit fluid to pass thereover.

3. In a regulator, a trough like member having an inclined bottom with the sides arranged equal distances apart at each end, and a reversible angular gate to fit the sides of the trough like member and adapted to be adjusted longitudinally of the inclined bottom, so as to permit fluid to pass thereover, the reversible angular gate having a long and a short arm, the short arm having its upper end disposed slightly below the upper edges of the trough like member, while the longer arm when upright is flush with the upper edges of the trough like member.

In testimony whereof I have signed my name to this specification in the presence of two subscribing witnesses.

GEORGE RAPPEEN PROCTOR.

Witnesses:
CLINTON FRITZ,
GEO. BENNETT.

Copies of this patent may be obtained for five cents each, by addressing the "Commissioner of Patents, Washington, D. C."